United States Patent [19]

Lamando, Jr. et al.

[11] Patent Number: 5,778,658

[45] Date of Patent: Jul. 14, 1998

[54] RECOUP TURBOJET ENGINE

[75] Inventors: Chester J. Lamando, Jr., Nahant; Wayne R. Oliver, Peabody, both of Mass.

[73] Assignee: General Electric Company, Cincinnati, Ohio

[21] Appl. No.: 773,460

[22] Filed: Dec. 24, 1996

[51] Int. Cl.⁶ .................................................. F02K 3/10
[52] U.S. Cl. ................................ 60/204; 60/261; 60/266
[58] Field of Search ........................... 60/39.07, 204, 60/261, 262, 266

[56] References Cited

U.S. PATENT DOCUMENTS

| 2,794,319 | 6/1957 | Stockdale | 60/261 |
| 2,846,841 | 8/1958 | Jordan | 60/261 |
| 3,394,543 | 7/1968 | Slattery | 60/39.07 |

OTHER PUBLICATIONS

Treager, Irwin E. *Aircraft Gas Turbine Engine Technology* McGraw-Hill, New York; 1979. pp. 175–177, 390–401.
General Electric Company. *J85 Engine Manual* Figures 1–39 and 1–57.

*Primary Examiner*—Louis J. Casaregola
*Attorney, Agent, or Firm*—Andrew C. Hess; Patrick R. Scanlon

[57] ABSTRACT

A turbojet engine includes a compressor and turbine, with a combustor disposed therebetween for generating exhaust gas. An afterburner includes an annular casing and liner spaced radially inwardly therefrom to define a cooling duct therebetween. A recoup duct is disposed in flow communication with the compressor for receiving a portion of compressed air therefrom as recoup air. A plenum is disposed at an upstream end of the afterburner casing, and includes an inlet disposed in flow communication with the recoup duct for receiving the recoup air, and an outlet disposed in flow communication with the afterburner cooling duct for discharging the recoup air therein.

18 Claims, 3 Drawing Sheets

RECOUP TURBOJET ENGINE

The U.S. Government has rights in this invention in accordance with Contract No. F41608-92-C-1057 awarded by the Department of the Air Force.

BACKGROUND OF THE INVENTION

The present invention relates generally to gas turbine engines, and, more specifically, to an augmented turbojet engine.

A typical turbojet engine includes a multi-stage axial compressor joined to a turbine having one or more stages for driving the compressor through a coaxial drive shaft extending therebetween. An annular combustor is disposed between the compressor and the turbine and mixes fuel with compressed air discharged from the compressor, which is then ignited in the combustor for generating hot combustion or exhaust gas which is channeled through the turbine which extracts energy therefrom. A portion of the energy extracted is used for driving the compressor and the remaining energy is used for jet propulsion in powering an aircraft.

A turbojet engine typically also includes an afterburner or augmenter disposed downstream from the turbine which includes flameholders and additional fuel injectors for injecting fuel into the exhaust gas when desired for producing additional combustion gas in the afterburner to increase engine thrust. The exhaust gas is then discharged from the engine through a conventional variable area exhaust nozzle mounted at the aft end of the afterburner which changes flow area as required for maximizing performance of the engine during dry or unaugmented operation, or during wet or augmented operation of the engine.

The afterburner further includes an annular outer casing and a combustion liner spaced radially inwardly therefrom defining a flow duct. Disposed at the upstream end of the afterburner is a conventional diffuser for diffusing the exhaust gas from the turbine, and includes an annular outer casing fixedly joined to the afterburner casing, and a diffuser liner spaced radially inwardly therefrom which joins the upstream end of the afterburner liner and defines a diffuser flow duct joined in flow communication with the afterburner flow duct.

During operation, the exhaust gas discharged from the turbine flows through the diffuser and afterburner, and a radially outer portion of the exhaust gas is captured by the upstream leading edge of the diffuser liner and is channeled through the annular diffuser duct into the annular afterburner duct which define cooling ducts. This portion of the exhaust gas, therefore, is conventionally used for cooling both the diffuser liner and afterburner liner which include various holes therethrough for effecting film cooling.

The high temperature environment of the exhaust diffuser and afterburner affects their useful lives. Thermal gradients in these components due to either cold or hot streaks, or both, introduce undesirable thermal stress which reduces life thereof.

A significant cause of thermal gradients in the casings and liners of the exhaust diffuser and afterburner is recoup air in one conventional turbojet engine, e.g. the General Electric Company J85 engine, which is locally injected through two ports in the diffuser casing upstream of the diffuser liner. Recoup air is that compressed air which leaks through the conventional labyrinth seal disposed between the last stage of the compressor and the compressor rear frame which is captured and rerouted immediately downstream of the turbine to ensure that it flows with the main exhaust flow through the afterburner and exhaust nozzle for maximizing engine performance. In some designs, the recoup air is simply dumped overboard from the engine and is thereby wasted and decreases overall engine performance.

One problem in reintroducing the recoup air between the turbine and the afterburner is that it creates local cold spots relative to the hot exhaust gas being discharged from the turbine. In the exemplary embodiment including two injection ports through the exhaust diffuser casing, two corresponding cold streaks are created in the exhaust gas. These two cold streaks create thermal gradients in the liners and casings of the exhaust diffuser and the afterburner which adversely affect the useful life of these components. It is therefore desirable to reduce thermal gradients caused by injection of the recoup air for increasing the useful life of the exhaust diffuser and afterburner.

SUMMARY OF THE INVENTION

A turbojet engine includes a compressor and turbine, with a combustor disposed therebetween for generating exhaust gas. An afterburner includes an annular casing and liner spaced radially inwardly therefrom to define a cooling duct therebetween. A recoup duct is disposed in flow communication with the compressor for receiving a portion of compressed air therefrom as recoup air. A plenum is disposed at an upstream end of the afterburner casing, and includes an inlet disposed in flow communication with the recoup duct for receiving the recoup air, and an outlet disposed in flow communication with the afterburner cooling duct for discharging the recoup air therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
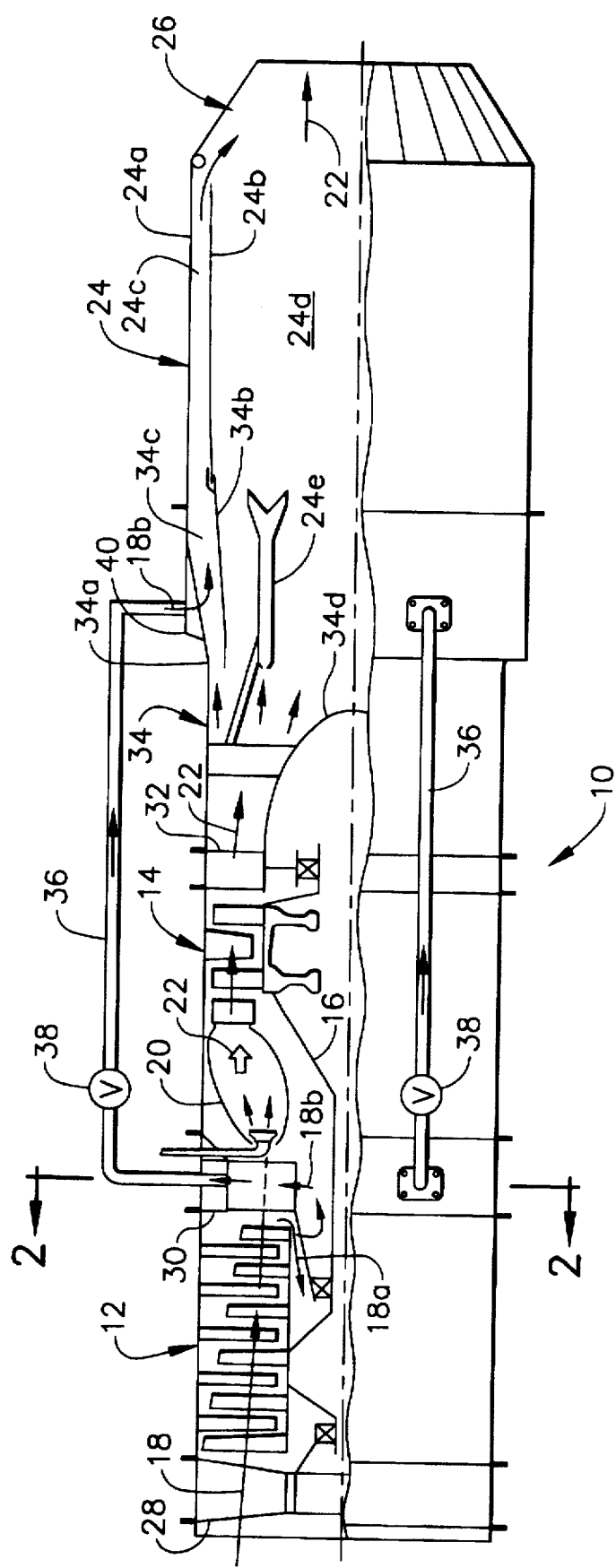
FIG. 1 is a schematic, partly sectional axial view of an exemplary augmented turbojet gas turbine engine including a recoup duct configured in accordance with one embodiment of the present invention for injecting recoup air around an afterburner liner.

Illustrated schematically in FIG. 1 is an exemplary augmented turbojet gas turbine engine 10 which includes a conventional multi-stage axial compressor 12 operatively joined to a conventional two-stage turbine 14 by a coaxial drive shaft or rotor 16. The compressor 12 includes various stages of rotor blades and cooperating stator vanes which operate in turn to compress air 18.

A conventional annular combustor 20 is disposed axially between the compressor 12 and the turbine 14, and receives the compressed air 18 from the compressor and mixes it with fuel injected from conventional fuel injectors, which is then conventionally ignited for generating hot combustion or exhaust gas 22 for powering the turbine 14.

The turbine 14 conventionally includes one or more rows of rotor blades extending outwardly from corresponding rotor disks, with corresponding stator vanes or nozzles cooperating therewith. The turbine 14 extracts energy from the exhaust gas 22 for rotating the shaft 16 and in turn powering the compressor 12. The remaining energy in the exhaust gas 22 is used for providing propulsion thrust through a conventional augmenter or afterburner 24 suitably attached downstream of the turbine 14.

The afterburner 24 includes an annular outer casing 24a and a coaxial annular combustion liner 24b spaced radially inwardly therefrom to define a cooling flow duct 24c therebetween. The afterburner liner 24b radially bounds a combustion zone 24d which defines the main flowpath of the afterburner for discharging the exhaust gas 22 therefrom.

Suitably attached to the aft end of the afterburner 24 is a conventional variable area exhaust nozzle 26 having adjustable primary exhaust flaps which control the discharge flow area for the exhaust gas 22 as required over the operating envelope of the engine 10.

The engine 10 also includes a conventional compressor front frame 28 which rotatably supports the forward end of the compressor 12 using a suitable bearing and also includes conventional inlet guide vanes which define the inlet of the engine 10 for receiving the air 18 prior to undergoing compression in the compressor 12. A conventional compressor rear frame 30 is disposed between the aft end of the compressor 12 and the combustor 20 for rotatably supporting the aft end of the compressor using a suitable bearing and for channeling the compressed air 18 to the combustor 20.

Figure 2:
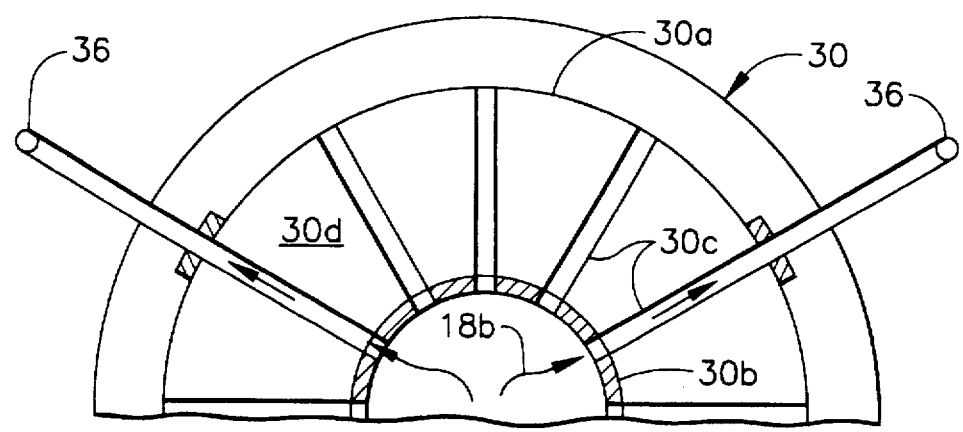
FIG. 2 is an elevational, partly sectional view of a portion of a compressor rear frame illustrated in FIG. 1 and taken generally along line 2—2.

A portion of the compressor rear frame 30 is illustrated in more particularity in FIG. 2 and includes coaxial outer and inner shells 30a and 30b, with a plurality of circumferentially spaced apart, hollow struts 30c extending radially therebetween. The flow passages defined between the adjacent struts 30c collectively define an annual diffuser 30d for diffusing the compressor discharge air as it flows to the combustor 20.

A conventional turbine frame 32 is disposed between the turbine 14 and the afterburner 24 for rotatably supporting the turbine 14 using a conventional bearing. The turbine frame includes a plurality of radially extending struts joined to coaxial outer and inner shells, with the struts typically being protected from the hot exhaust gas 22 by conventional fairings surrounding each of the struts.

An annular exhaust diffuser 34 is disposed axially between the turbine 14 and afterburner 24, and includes an outer casing 34a fixedly joined to the afterburner casing 24a. The diffuser 34 also includes an annular diffuser liner 34b fixedly joined to the upstream end of the afterburner liner 24b to define a diffuser cooling duct 34c which concentrically joins the afterburner cooling duct 24c. A conventional cone or centerbody 34d is fixedly joined to the diffuser casing 34a through radial struts for suitably effecting diffusion of the exhaust gas 22 discharged from the turbine 14 and through the turbine frame 32. A conventional flameholder 24e having cooperating fuel injectors is suitably mounted coaxially below the diffuser liner 34b for effecting augmented operation of the engine 10.

The engine 10 as described above is conventional in configuration and operation. The compressed air 18 discharged from the compressor 12 is mixed with fuel and ignited in the combustor 20 for generating the hot exhaust gas 22 which flows downstream through the turbine 14, and in turn, through the exhaust diffuser 34 and afterburner 24 and is then discharged from the exhaust nozzle 26. During augmented operation of the engine 10, additional fuel is conventionally provided at the flameholder 24e wherein it is mixed with the exhaust gas 22 and undergoes additional combustion in the combustion zone 24d for providing additional thrust upon discharge through the exhaust nozzle 26.

In wet operation, the flameholder 24e supports the combustion flame downstream therefrom and radially inwardly of the afterburner liner 24b. In order to cool the diffuser liner 34b and the afterburner liner 24b, a radially outer portion of the exhaust gas 22 channeled through the turbine frame 32 is captured by the leading edge of the diffuser liner 34b and flows in turn through the annular diffuser cooling duct 34c and the annular afterburner cooling duct 24c. The liners 24b and 34b have suitable apertures therethrough which provide effective film cooling of the liners using the exhaust gas 22. Although the exhaust gas 22 itself is hot, it is relatively cool compared to the combustion flame effected in the combustion zone 24d during augmented operation of the engine.

Since the rotor blades of the compressor 12 illustrated in FIG. 1 rotate relative to the stationary compressor rear frame 30, a conventional labyrinth seal is provided between the last rotor blade stage of the compressor 12 and the corresponding forward portion of the compressor rear frame 30 for controlling leakage of the compressor discharge air 18 from the main flowpath between the compressor 12 and the air diffuser 30d of the frame 30. Nevertheless, a small portion of the compressed air 18 leaks between the compressor 12 and the compressor rear frame 30 and is designated in FIG. 1 by the reference numeral 18a showing an exemplary flowpath radially inwardly over the bearing support cone of the rear frame 30. The compressor leakage air 18a may be conventionally used in thrust balancing of the compressor 12, and therefore may be suitably regulated if desired. A portion of the air 18 leaking between the compressor 12 and the compressor rear frame 30 at the labyrinth seal is referred to as recoup air designated 18b and may be suitably dumped overboard from the engine 10 which is usually not desirable since this adversely affects performance of the engine 10.

In accordance with one embodiment of the present invention, the recoup air 18b illustrated in FIG. 1 is channeled from the compressor 12 to the afterburner 24 and discharged into the afterburner cooling duct 24c wherein it is mixed with a portion of the exhaust gas 22 flowing therethrough for reducing or eliminating cold spots therefrom. In this way, the relatively cool recoup air 18b may be channeled from the compressor 12 and reintroduced in the engine in the afterburner 24 without introducing significant thermal gradients in the components thereof which would adversely affect their use. The recoup air 18b mixes with the exhaust gas 22 in the afterburner cooling duct 24c and is then discharged from the aft end of the afterburner liner 24b to establish a film for cooling of the flaps of the exhaust nozzle 26.

As shown in FIG. 2, the struts 30c of the compressor rear frame 30 are preferably hollow with at least one of the struts 30c being configured with an inlet through the inner shell 30b for receiving the recoup air 18b, and having an outlet through the outer shell 30a for discharging the recoup air 18b radially outwardly. A suitable recoup conduit or duct 36 as shown in FIGS. 1 and 2 is disposed in flow communication with the recoup strut 30c for receiving the recoup air therefrom. In the exemplary embodiment illustrated, a pair of the recoup ducts 36 are provided in parallel flow from corresponding ones of the recoup struts 30c at 10 o'clock and 2 o'clock circumferential positions, for example. Each of the recoup ducts 36 may include a suitable valve 38 disposed in serial flow therein for controlling flow of the recoup air 18b therethrough for in turn controlling flow of the leakage air 18a for thrust balancing purposes if desired.

As shown in FIG. 1, the recoup ducts 36 are suitably disposed in flow communication with a preferably annular manifold or plenum 40 disposed at an upstream end of the afterburner casing 24a, and for example, forming a portion of the exhaust diffuser casing 34a. The plenum 40 is illustrated in more particularity in FIGS. 3 and 4 and is provided for circumferentially distributing the recoup air 18b from the individual recoup ducts 36 for decreasing thermal gradients therefrom upon mixing with the exhaust gas 22 in the cooling ducts 34c and 24c.

The plenum 40 includes two radially outer inlets 40a disposed in flow communication with respective ones of the recoup ducts 36 for receiving the recoup air. The plenum 40 also includes one or more radially inner outlets 40b disposed in flow communication with the exhaust diffuser cooling duct 34c and in turn with the afterburner cooling duct 24c for discharging the recoup air therein for mixing with the portion of the exhaust gas 22 flowing therethrough.

Figure 4:
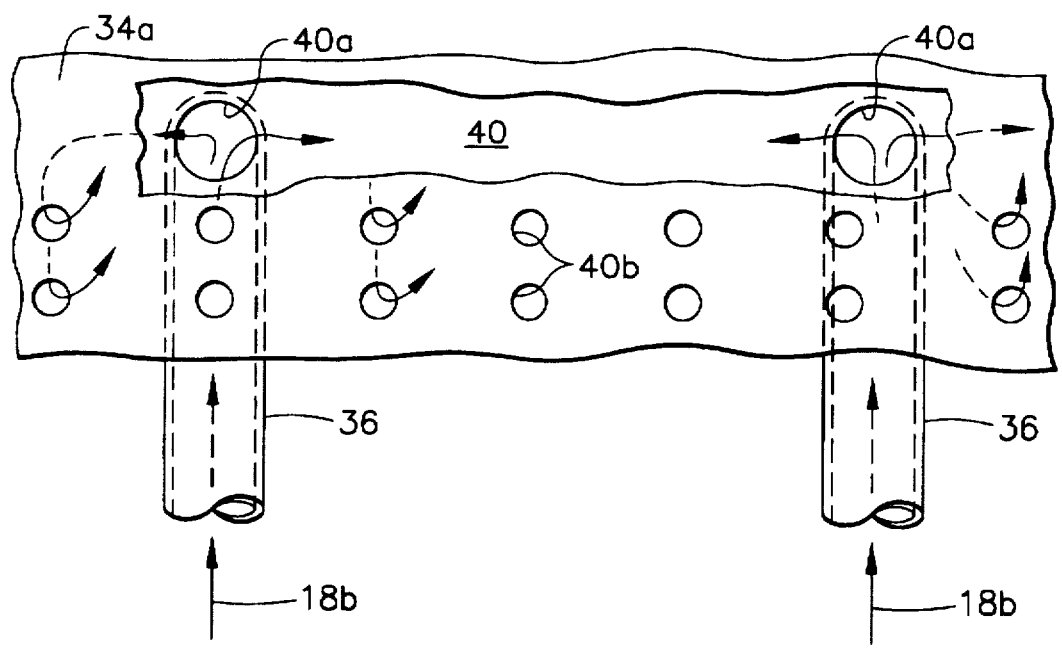
FIG. 4 is a radially outwardly facing view of a portion of the recoup plenum illustrated in FIG. 3 and taken generally along line 4—4.
Figure 3:
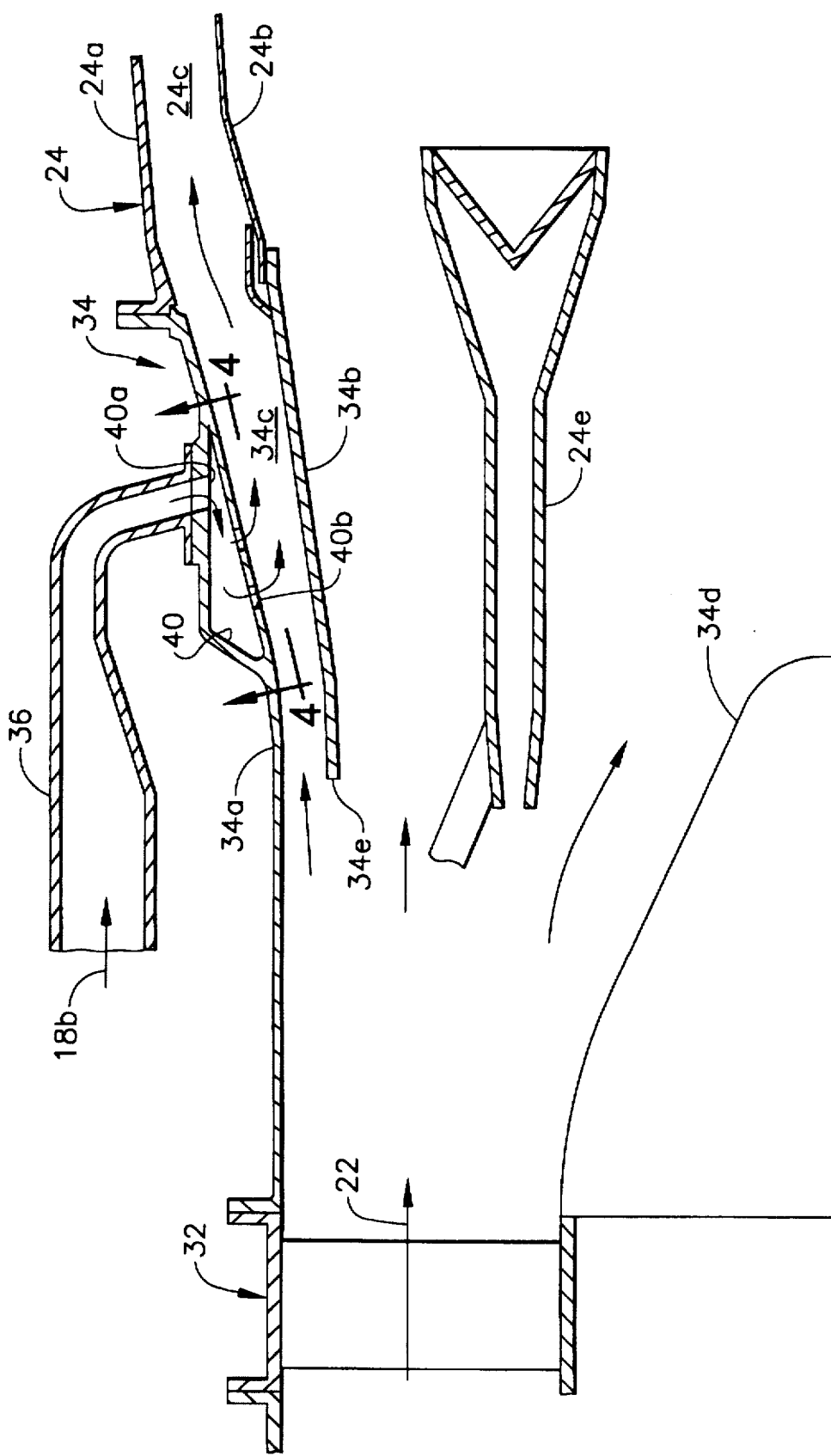
FIG. 3 is an enlarged, axial sectional view of the downstream end of the recoup duct illustrated in FIG. 1 including a plenum in accordance with an exemplary embodiment of the present invention for injecting the recoup air around an exhaust diffuser liner for flow into the cooling duct around the afterburner liner.

As shown in FIGS. 3 and 4, the plenum 40 is preferably disposed in the diffuser casing 34a axially between the upstream and downstream ends of the diffuser liner 34b for discharging the recoup air 18b firstly along the outer surface of the diffuser liner 34b, and then in turn along the outer surface of the afterburner liner 24b. In this way, the recoup air 18b is reintroduced in the engine 10 radially above the flameholder 24e as illustrated in FIG. 3 in a region of the afterburner 24 not directly exposed to combustion flame during augmented, wet operation of the engine. The recoup air 18b therefore is allowed to travel axially downstream through the diffuser cooling duct 34c wherein it undergoes mixing with the exhaust gas 22 therein for decreasing thermal gradients therefrom. The recoup air 18b undergoes additional mixing in the afterburner cooling duct 24c for further decreasing the temperature gradients thereof. In this way, the recoup air 18b is reintroduced in the engine with little or no adverse temperature gradient therefrom and is also effective for improving cooling of the liners 24b and 34b during operation.

As shown in FIG. 4, the pair of recoup ducts 36 are joined to the plenum 40 through corresponding ones of the plenum inlets 40a. And, the plenum 40 is preferably annular and extends circumferentially around the diffuser casing 34a for circumferentially distributing the recoup air from the plenum inlets 40a to the plenum outlets 40b.

As shown in FIG. 4, a plurality of the plenum outlets 40b are preferably provided around the circumference of the diffuser casing 34a and spaced apart circumferentially therearound for distributing the recoup air into the diffuser cooling duct 34c. The plenum outlets 40b may take any suitable size and pattern, and for example, are preferably disposed in a plurality of axially spaced apart rows.

As shown in FIG. 3, the diffuser liner 34b has an upstream or leading edge which defines a diffuser cooling duct inlet 34e which is disposed in flow communication with the turbine 14 or turbine frame 32 for receiving the radially outer portion of the exhaust gas 22 therefrom for mixing with the recoup air 18b in the diffuser cooling duct 34c. In this way, the recoup air 18b is discharged into the diffuser cooling duct 34c as the exhaust gas 22 enters the duct inlet 34e, with the circumferentially spaced apart plenum outlets 40b circumferentially distributing the recoup air into the cooling duct 34c for reducing thermal gradients and cold streaks therefrom. Since the flameholder 24e is disposed radially below the diffuser liner 34b the combustion flame during wet operation is held below the afterburner liner 24b and not below the diffuser liner 34b. This allows the recoup air 18b to undergo substantial mixing with exhaust gas 22 in the diffuser cooling duct 34c prior to flow through the afterburner cooling duct 24c for improving effectiveness of reducing thermal gradients and for more effectively cooling both the afterburner casing 24a and liner 24b.

The mixed recoup air and turbine discharge exhaust gas in the annuluses defined by the diffuser and afterburner cooling ducts 34c and 24c is significantly cooler than the temperature of the turbine discharge exhaust gas 22 itself. This cooled mixture is therefore effective for significantly cooling downstream components of the afterburner including the liners 24b and 34b, and the casings 24a and 34a, as well as the exhaust nozzle 26 which receives the mixture prior to discharge from the engine. The reduction of both thermal gradients and maximum temperature in the afterburner combine to significantly improve the useful life thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbojet engine comprising:
   a compressor operatively joined to a turbine by a shaft;
   a combustor disposed operatively between said compressor and turbine for combusting fuel with compressed air received from said compressor to generate exhaust gas for powering said turbine;
   an afterburner including an annular casing and an annular combustion liner spaced radially inwardly therefrom to define a cooling duct therebetween;
   a recoup duct disposed in flow communication with said compressor for receiving a portion of said compressed air therefrom as recoup air; and
   a plenum disposed at an upstream end of said afterburner casing, and having an inlet disposed in flow communication with said recoup duct for receiving said recoup air, and a plurality of circumferentially spaced apart outlets disposed in flow communication with said cooling duct for discharging said recoup air therein.

2. An engine according to claim 1 further comprising:
   a compressor rear frame disposed axially between said compressor and said combustor for rotationally supporting said compressor, and including a plurality of circumferentially spaced apart struts defining a diffuser disposed in flow communication with said compressor for receiving said compressed air therefrom, and disposed in flow communication with said combustor for channeling said compressed air thereto, with at least one of said struts being configured as a recoup strut for receiving a portion of said compressed air leaking between said compressor and compressor rear frame, and channeling said portion as said recoup air radially outwardly through said recoup strut; and said recoup duct being disposed in flow communication with said recoup strut for receiving said recoup air therefrom.

3. An engine according to claim 2 further comprising:

an exhaust diffuser disposed axially between said turbine and said afterburner, and including an outer casing fixedly joined to said afterburner casing, and a liner fixedly joined to said afterburner liner to define a diffuser duct join said cooling duct; and said plenum being disposed in said diffuser casing for discharging said recoup air firstly along said diffuser liner and in turn along said afterburner liner.

4. An engine according to claim 3 further comprising:

a pair of said recoup ducts disposed in parallel flow from corresponding ones of a pair of said recoup struts to corresponding ones of a pair of said plenum inlets; and said plenum extends circumferentially for circumferentially distributing said recoup air from said plenum inlets to said plenum outlets.

5. An engine according to claim 4 wherein said plenum is annular, and said plenum outlets are spaced apart circumferentially therearound.

6. An engine according to claim 5 wherein said plenum outlets are disposed in a plurality of axially spaced apart rows.

7. An engine according to claim 5 wherein said diffuser liner has an upstream end defining a duct inlet disposed in flow communication with said turbine for receiving a portion of said exhaust gas therefrom for mixing with said recoup air in said diffuser duct.

8. An engine according to claim 7 further comprising a flameholder disposed radially below said diffuser liner for holding a flame below said afterburner liner.

9. A method for recouping compressor discharge air leaking from between a compressor and a supporting rear frame in a turbojet engine further including a turbine joined to said compressor, and an afterburner disposed downstream from said turbine, said method comprising;

channeling said leaking air as recoup air from said compressor to said afterburner; and circumferentially discharging said recoup air into said afterburner through a plurality of circumferentially spaced apart outlets into a cooling duct defined between an outer casing and a combustion liner therein.

10. A method according to claim 9 further comprising:

channeling said recoup air between said compressor and afterburner in a plurality of circumferentially spaced apart flowpaths; and circumferentially distributing said recoup air from each of said flowpaths into said cooling duct.

11. An engine according to claim 1 wherein said cooling duct includes an inlet disposed in flow communication with said turbine for receiving a portion of said exhaust gas therefrom for mixing with said recoup air inside said cooling duct.

12. An engine according to claim 11 wherein said plenum is disposed radially outwardly of said cooling duct.

13. An engine according to claim 11 wherein said plenum outlets are disposed radially inwardly of said plenum.

14. An engine according to claim 1 further comprising:

an exhaust diffuser disposed axially between said turbine and said afterburner, and including an outer casing fixedly joined to said afterburner casing, and a liner fixedly joined to said afterburner liner to define a diffuser duct joining said cooling duct; and said plenum being disposed in said diffuser casing for discharging said recoup air firstly along said diffuser liner and in turn along said afterburner liner.

15. An engine according to claim 14 wherein said plenum is annular, and said plenum outlets are spaced apart circumferentially therearound.

16. An engine according to claim 15 wherein said plenum outlets are disposed in a plurality of axially spaced apart rows.

17. An engine according to claim 1 wherein said liner has an upstream end defining a duct inlet disposed in flow communication with said turbine for receiving a portion of said exhaust gas therefrom for mixing with said recoup air in said cooling duct.

18. An engine according to claim 17 further comprising:

an exhaust diffuser disposed axially between said turbine and said afterburner, and including an outer casing fixedly joined to said afterburner casing, and a liner fixedly joined to said afterburner liner to define a diffuser duct joining said cooling duct;

said plenum being disposed in said diffuser casing for discharging said recoup air firstly along said diffuser liner and in turn along said afterburner liner; and said duct inlet being defined at an upstream end of said duct liner.

* * * * *